No. 764,900.

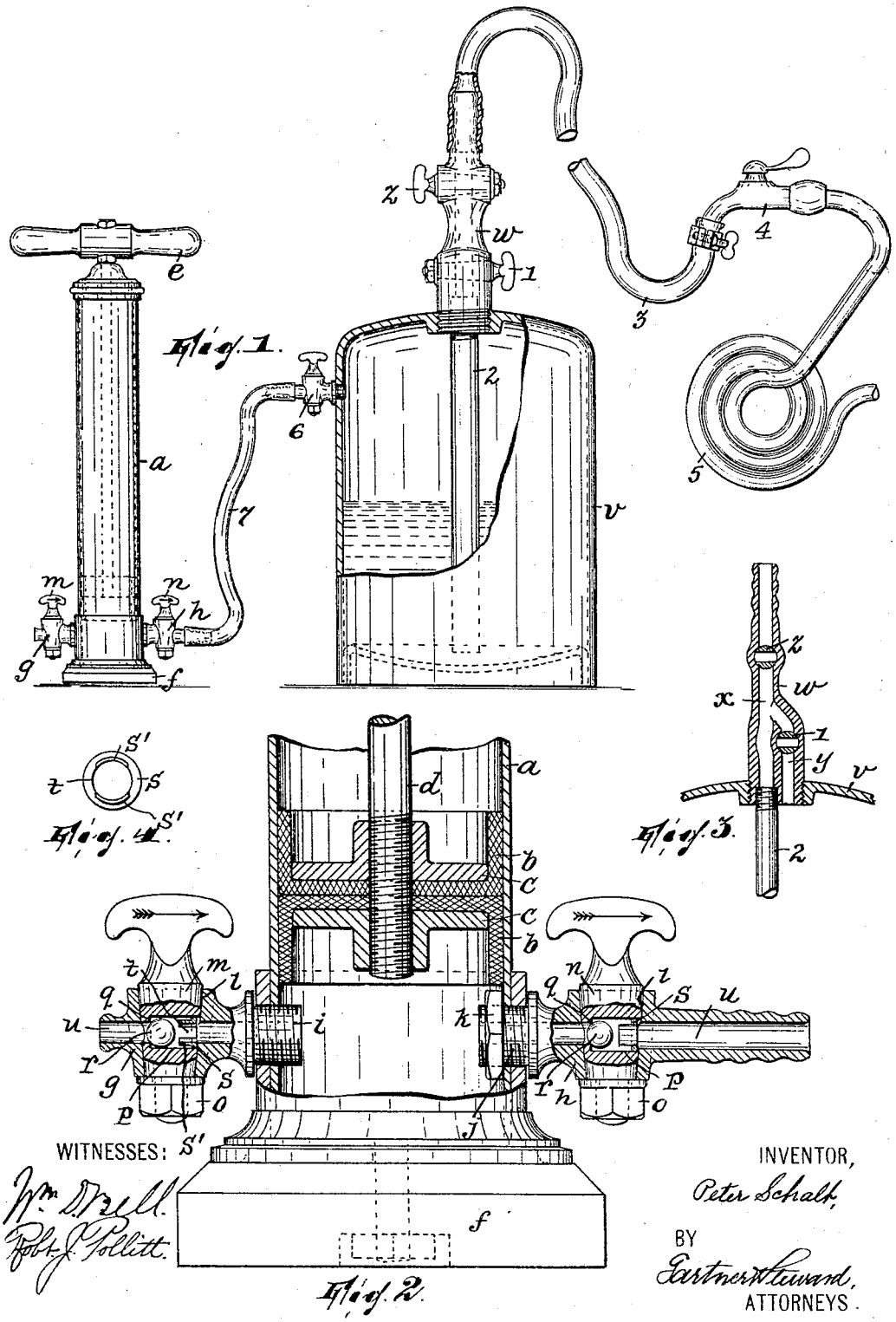

Patented July 12, 1904.

UNITED STATES PATENT OFFICE.

PETER SCHALT, OF PATERSON, NEW JERSEY.

PIPE-CLEARING APPARATUS.

SPECIFICATION forming part of Letters Patent No. 764,900, dated July 12, 1904.

Application filed January 21, 1904. Serial No. 189,958. (No model.)

*To all whom it may concern:*

Be it known that I, PETER SCHALT, a citizen of the United States, residing in Paterson, in the county of Passaic and State of New Jersey, have invented certain new and useful Improvements in Pipe-Clearing Apparatus; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to means for removing clogging matter from tubular bodies, as in the case of sediment accumulated in the tubing of a beer-cooling apparatus; and it consists in a simple and conveniently-operated means whereby the clogging matter may be removed by forcing it in either direction, whichever is the more practicable or desirable.

The invention further consists in an improved form of valve making possible the alternative action above referred to of the means mentioned.

The invention is fully illustrated in the accompanying drawings, wherein—

Figure 1 shows my apparatus, partly in side elevation and partly in section, attached to a beer-cooling coil. Fig. 2 is an enlarged view, in vertical section, of the pump which serves as the prime actuating means for the apparatus. Fig. 3 is a longitudinal sectional view of a certain fitting for an air-reservoir, and Fig. 4 is an inner face view of a certain stop-valve.

In said drawings, $a$ is a pump-cylinder containing a piston which comprises two reversed cup-shaped packings $b$ and two clamping-disks $c$, which secure said packings together onto the piston-rod or stem. $d$ is said piston-rod, and $e$ is its operating-handle. The cylinder is preferably mounted on a foot-plate $f$.

$g$ and $h$ are two pipes or tubes having threaded portions $i$ and $j$, whereby they may be screwed into the cylinder or held there by nuts, as $k$. Each of these pipes is penetrated transversely by a conical hole $l$, which receives a conical turn-valve $m$ $n$, held in place by a nut $o$. Each valve is in turn penetrated transversely by a valve-chamber $p$, one end of which is reduced to form at $q$ a valve-seat. In this valve-chamber is a valve $r$, preferably a ball-valve, and the movement of this valve away from the seat is limited by a valve-stop in the form of an annulus $s$, having spaced projections $s'$ extending from the inner face thereof toward the valve. The spacing of the projections forms passages $t$, which, it being remarked that the ball is of smaller diameter than the valve-chamber, permit a fluid entering the valve-chamber from the farther end thereof and passing the ball-valve to pass out of the valve-chamber into the pipe. Since the annulus is a little larger than conduit or bore $u$ of the pipe, the annulus cannot be displaced toward the latter when said bore and the valve-chamber are registering, and the projections $s'$ obviate undue displacement of the annulus in the other direction, as by tilting over.

In view of the foregoing it will be observed that if a fluid is compressed in cylinder $a$ and valve-chamber $p$ of either valve $m$ $n$ registers with the bore $u$ of the corresponding pipe the fluid can escape past the valve $r$ if the valve-seat $q$ is adjacent the cylinder. If the valve-seat is remote from the cylinder, the valve $r$ will take against the same and close the passage through the valve-chamber $p$. If the two turn-valves are relatively disposed the same, the movements of the piston will cause air or other fluid to enter the cylinder through one pipe and be discharged through the other, and if either turn-valve is turned at right angles to the position in which it appears in the drawings the passage through the corresponding pipe will in either direction be closed.

$v$ designates a tank into the top of which is screwed or otherwise secured (preferably removably) a nipple $w$, having a main passage-way or bore $x$ and a branch bore $y$, leading into the tank. In the main passage-way above the branch is a turn-valve $z$, and in the branch is another turn-valve, 1, both of ordinary construction. Communicating with the main bore in the nipple at the lower end thereof is a pipe 2, which leads nearly to the bottom of the tank. The upper end of the nipple may receive a flexible tube 3, leading from the tap or nozzle 4 of the cooling-coil 5.

Near the top of the tank is arranged a petcock 6, which is connected with one of the pipes or tubes $g$ $h$ by a flexible tube 7.

The operation is as follows: The turn-valves $m$ $n$, being arranged as shown in Fig. 2, when the piston is operated air will be drawn into the cylinder through pipe $g$ and forced out through pipe $h$ into the tank $v$. This tank should have been previously partly filled with a suitable liquid, such as water and soda. The pressure created in the tank will force this liquid out of the tank by way of pipe 2 and the main passage of nipple $w$ into the cooling-coil, where it will break up and remove the clogging matter therein. By reversing both turn-valves $m$ $n$ the action of the piston will cause a reduction of pressure instead of an increase in the tank, so that the liquid in the coil will be drawn into the tank. Again, if both turn-valves $z$ and 1 are open when turn-valves $m$ $n$ are arranged for effecting compression in the tank a mixture of air and liquid may be forced from the tank into the cooling-coil. Such an expedient acts more thoroughly in clearing away the obstruction.

Having thus fully described my invention, what I claim, and desire to secure by Letters Patent of the United States, is—

1. The combination of a liquid-holding tank, a nipple having a main bore and a branch bore leading from the main bore into the tank, a means for connecting said nipple with the obstructed tubular body, a pipe leading from the main bore of said nipple to the bottom of said tank, and a means for altering the pressure in the tank communicating with the same near the top thereof, substantially as described.

2. The combination of a liquid-holding tank, a nipple having a main bore and a branch bore leading from the main bore into the tank, a valve controlling the branch, another valve controlling the main bore and disposed, relatively to the tank, beyond the juncture of the branch with the main bore, means for connecting said nipple with the obstructed tubular body, a pipe leading from the main bore of said nipple to the bottom of the tank, and means for altering the pressure in the tank communicating with the same near the top thereof, substantially as described.

3. The combination of a liquid-holding tank, a nipple having a main bore and a branch bore leading from the main bore into the tank, a valve controlling the branch, another valve controlling the main bore and disposed, relatively to the tank, beyond the juncture of the branch with the main bore, means for connecting said nipple with the obstructed tubular body, a pipe leading from the main bore of said nipple to the bottom of the tank, a pump, means for connecting the pump with the top portion of the tank, and means for rendering the pump convertible so as to either act to exhaust or effect compression in said tank, substantially as described.

In testimony that I claim the foregoing I have hereunto set my hand this 18th day of January, 1904.

PETER SCHALT.

Witnesses:
JACHN OURZARARYZEK,
ALFRED GARTNER.